March 3, 1942.  E. FISCHER  2,274,922
REACTION VESSEL
Filed July 11, 1938
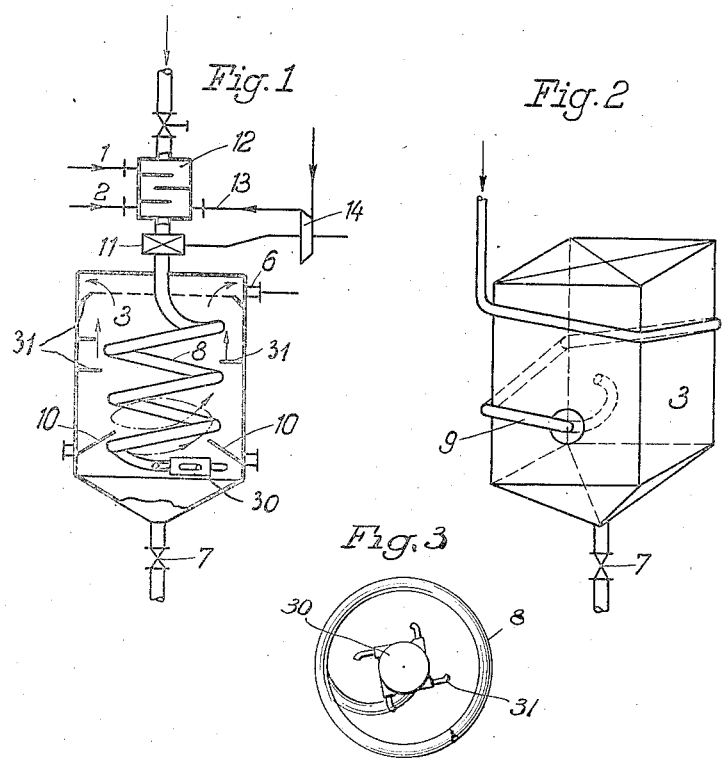
Inventor:
Emil Fischer
by Michael & Michaelis,
Attys.

UNITED STATES PATENT OFFICE 2,274,922

REACTION VESSEL

Emil Fischer, Essen, Germany

Application July 11, 1938, Serial No. 218,612
In Germany July 23, 1937

1 Claim. (Cl. 210—16)

This invention relates to means for carrying through chemical reactions and more particularly to the purification of water.

It is an object of this invention to provide means whereby reactions such as occur in dilute solutions, as for example in water, can be carried out in a particularly advantageous manner.

In water purification plants as hitherto in use the water and the reagent to be added to it are passed through separate conduits into a kind of inverted funnel suspended in a container and fitted with suitable mixing or stirring devices. The reaction between the water and the added substance takes place to the greater part in the funnel and the liquid then rises in the container and escapes through an overflow or the like. Obviously the reaction must have come to an end before the liquid leaves the container and the solid matter formed in the reaction must have settled down in the container by gravity action.

According to this invention the apparatus above described is replaced by devices such as illustrated by way of example in a purely diagrammatic manner in the drawing affixed to this specification and forming part thereof.

In the drawing

Fig. 1 is a vertical section of an apparatus embodying my invention, while

Fig. 2 is a perspective view of a modified form.

Fig. 3 is a plan view of an ejector head and nozzles mounted at the bottom end of the spiral feed pipe.

According to the present invention a vortex is created at the outlet of the tube or conduit, through which the liquid such as water and the reagent are fed to the container.

Preferably the vortex is generated in the bottom part of the container by introducing the reaction mixture into the container at high velocity through a spiral pipe, the end of which is annularly curved, so that the liquid is forced to travel in a helical path, whereby the sludge settled on the bottom or suspended in the bottom part of the container is whirled through.

I have found it particularly useful to employ a feed pipe in the form of a spiral or a system of pipes extending in spirals and to fit the spiral pipe or pipes with ejector-like nozzles. I am thus enabled to not only stir up the sludge which has already settled down on the bottom of the container, but to also effect an intimate whirling through of the reagents with the liquid to be reacted. The spiral form of the pipe through which the reaction mixture passes at high velocity, also effects an intimate contact between the liquid and the pipe wall and a favorable catalytic influencing of the reaction so that the greater part of the substances to be reacted with each other have already done so before entering the container. By this arrangement I obtain the further advantage that clogging of the pipes and container is avoided, since the liquid passing through at high speed carries along the solid matter which is thus prevented from clogging the pipes.

Referring to the drawing and first to Fig. 1, 1 and 2 are the pipes, through which the solution and the reagents, after having passed through a mixing and preheating vessel 12, where they are heated up by means of steam entering through pipe 13, are forced by the pump 11 through the spiral pipe 8 into the container 3. 30 is an ejector head with nozzles 31 mounted on the bottom end of pipe 8 and 10 are spiral guide vanes which serve for slowly diminishing the whirling movement of the liquid. Owing to the fact that a large part of the liquid is intimately contacted with the surface of the vanes 10, a catalytic action is exerted on the reactants in addition to the catalytic action already exerted on the liquid by the inner wall of the spiral pipe. Preferably the vanes 10 are so shaped as to further the separation of the clarified liquid from the liquid still containing solid matter. The catalytic action and the further separation of the clarified liquid from the liquid still containing solid matter can be increased by means of baffles such as shown at 31.

The sludge is tapped intermittently through a valve 7.

The pump 11 may be driven by an engine 14, from which exhaust steam may pass through the pipe 13 to the preheater 12. The pump may also be replaced by some other liquid conveyor, for instance an ejector fed with water from the boiler.

If the liquid shall be preheated above 100° C., the pump or other conveying device may be dispensed with, provided that in the heating of the preheater with the aid of steam under pressure, this pressure is utilized for conveying the liquid. If proceeding in this manner, the preheating of the liquid with the aid of a customary steam pressure regulator will bring about a constant pressure in the reaction system as a whole. Such preheating device may also prove of great value in connection with the apparatus hitherto used for the same purpose.

In the modified form of an apparatus shown in Fig. 2 the pipe 9, through which the reaction mixture enters the container, is arranged outside of the container and the example illustrated in the drawing is composed of straight pipes assembled by means of bends which offers the advantage of ready exchange of the parts and an easy access to the interior of the pipe. Preferably the individual parts, of which such a pipe is composed, are fitted with suitable valves or other closures which allow each pipe to be cleaned separately.

Various changes may be made in the details disclosed in the foregoing specification without departing from the invention or sacrificing the advantages thereof.

I claim:

Reaction vessel comprising in combination, a liquid container, a spiral pipe extending into said container and into proximity of its bottom, means at the bottom end of said pipe for creating a vortex in the liquid in the container, spiral-shaped guide vanes on the inner wall of the container and means for forcing a reaction mixture through the pipe into the container at a high velocity of flow.

EMIL FISCHER.